United States Patent
Korsgaard et al.

(10) Patent No.: US 10,497,957 B2
(45) Date of Patent: Dec. 3, 2019

(54) REFORMER FOR A FUEL CELL SYSTEM

(71) Applicant: SERENERGY A/S, Aalborg (DK)

(72) Inventors: Anders Risum Korsgaard, Aalborg (DK); Mads Bang, Skorping (DK)

(73) Assignee: SERENERGY A/S, Aalborg (DK)

(*) Notice: Subject to any disclaimer, the term of this patent is extended or adjusted under 35 U.S.C. 154(b) by 301 days.

(21) Appl. No.: 15/325,032

(22) PCT Filed: Jul. 16, 2015

(86) PCT No.: PCT/DK2015/000026
§ 371 (c)(1),
(2) Date: Jan. 9, 2017

(87) PCT Pub. No.: WO2016/008487
PCT Pub. Date: Jan. 21, 2016

(65) Prior Publication Data
US 2017/0200960 A1    Jul. 13, 2017

(30) Foreign Application Priority Data

Jul. 16, 2014 (DK) .................................. 2014 00392

(51) Int. Cl.
*B01J 19/24* (2006.01)
*C01B 3/32* (2006.01)
(Continued)

(52) U.S. Cl.
CPC ......... *H01M 8/0631* (2013.01); *B01J 19/249* (2013.01); *C01B 3/323* (2013.01); *H01M 8/04022* (2013.01); *H01M 8/0618* (2013.01); *H01M 8/241* (2013.01); *H01M 8/2457* (2016.02); *B01J 2219/2453* (2013.01); *B01J 2219/2458* (2013.01);
(Continued)

(58) Field of Classification Search
None
See application file for complete search history.

(56) References Cited

U.S. PATENT DOCUMENTS

| 6,159,434 A * | 12/2000 | Gonjo | .................... B01J 10/007 422/200 |
| 2001/0029735 A1 | 10/2001 | Miura et al. | |
| 2007/0044380 A1 | 3/2007 | Hwang et al. | |

FOREIGN PATENT DOCUMENTS

| EP | 0861802 A2 | 9/1998 |
| WO | 2006126701 A1 | 11/2006 |
| WO | 2007047898 A1 | 4/2007 |

OTHER PUBLICATIONS

PCT International Search Report for PCT International Patent Application No. PCT/DK2015/000026, dated Nov. 11, 2015.

* cited by examiner

Primary Examiner — Miriam Stagg
Assistant Examiner — Haroon S. Sheikh
(74) Attorney, Agent, or Firm — Holland & Hart LLP

(57) ABSTRACT

A fuel cell system comprising a fuel cell stack, an evaporator for evaporating a mixture of methanol and water to be forwarded through a catalytic reformer for producing portions of free hydrogen. The fuel cell stack being composed of a number of proton exchange membrane fuel cells each featuring electrodes in form of an anode and a cathode for delivering an electric current. The system provides an enhanced catalytic reformer for a fuel cell system, which enables a compact design of the reformer for integration into a flat, rack mountable system.

20 Claims, 2 Drawing Sheets

(51) Int. Cl.
    *H01M 8/04014* (2016.01)
    *H01M 8/0612* (2016.01)
    *H01M 8/241* (2016.01)
    *H01M 8/2457* (2016.01)

(52) U.S. Cl.
    CPC .......... *B01J 2219/2467* (2013.01); *B01J 2219/2474* (2013.01); *B01J 2219/2481* (2013.01); *B01J 2219/2498* (2013.01); *C01B 2203/0233* (2013.01); *C01B 2203/066* (2013.01); *C01B 2203/0805* (2013.01); *C01B 2203/1223* (2013.01); *C01B 2203/1288* (2013.01); *C01B 2203/1294* (2013.01)

REFORMER FOR A FUEL CELL SYSTEM

TECHNICAL FIELD

The present invention is generally concerned with the art of generating electrical energy by means of fuel cells. More specifically, it relates to a fuel cell system comprising a fuel cell stack, an evaporator for evaporating a mixture of methanol and water to be fed through a catalytic reformer for producing portions of free hydrogen, the fuel cell stack being composed of a number of proton exchange membrane fuel cells each featuring electrodes in form of an anode and a cathode for delivering an electric current, the reaction of free hydrogen into ionic form with contact to the anode being proportional to the flow of electric current between the electrodes.

BACKGROUND OF THE INVENTION

Electrochemically, a fuel cell converts a raw fuel into electrical energy and heat and will continue the production as long as raw fuel is being continuously supplied.

The basic conversion technology of fuel cells is well known for at least a century but has come into a renaissance with the latest development and demands for fuel saving and environmental friendly technology. Additionally fuel cell technology is advantageous for electrical supply on mobile or remote platforms and for backup solutions.

Briefly explained, using the protone exchange membrane technology, a fuel cell needs a supply of hydrogen to be passed along a first electrode, forming the anode, and a supply of oxygen, typically taken directly as atmospheric air, to be passed along a second electrode, forming the cathode. Arranged between the electrodes is an ion-conducting layer, typically a polymer film comprising platine and phosphoric acid. Supplying the hydrogen and oxygen, generates an electrical voltage between the electrodes and a current will be able to flow between the electrodes and supply an attached electrical consumer. Corresponding to the draw of current, a number of hydrogen and oxygen molecules will react, and later when combined in the exhaust the hydrogen ions and oxygen will form water as the end product. Additionally the system will generate heat.

Since the necessary oxygen supply is achieved by taking in sufficient amounts of oxygen containing atmospheric air, the overall need for utilizing a fuel cell is to form a steady and sufficient supply of hydrogen. Supplying hydrogen can possibly be from pressurized cylinders, small or large, but the distribution and storage is critical since hydrogen is a highly explosive gas. Pressurizing hydrogen is quite energy consuming and even in pressurized form hydrogen takes up relatively much space. A better solution is to generate hydrogen directly on the spot by conversion of more stable forms of fuel into a synthetic gas containing high amounts of hydrogen, hereafter called a syngas.

Appreciated is the process of using methanol for producing the hydrogen containing syngas for the obvious advantages when it comes to distribution. The technology describe both low and high temperature fuel cell stacks where a temperature of 120 degrees celsius is the temperature for which the split between the technologies is commonly understood. More specifically a low temperature system commonly works in the temperature area around 70 degrees Celsuis and the high temperature system at around 160 degrees Celsius. However, for both technologies apply that the process requires a reformer, for processing the fuel and supplying a syngas containing free hydrogen. The fuel processed is methanol in an aquatic solution, hereafter referenced as liquid fuel. In a first stage, a heater evaporates the liquid fuel and the gas is forwarded to the reformer. The reformer includes a catalyst including copper, which in addition to heat converts the liquid fuel into a syngas mainly consisting of hydrogen with a relatively large content of carbon dioxide and a small content of water mist and carbon monoxide. The syngas is directly useable as a fuel supply for supplying the fuel cell.

For an effective operation of the reformer, the state of art suggests the reformer to be arranged as an upright standing entity, such that the incoming gas cannot escape without interaction with the reformer catalyst and be reformed to the appreciated syngas. This design manner is though a challenge when the wish is to build a fuel cell system that is more compact and preferably is designed as an exchangeable rack unit with the obvious advantages.

Thus, there is a need for an improvement of the design of the reformer in order to achieve a more compact design. There is also a need for an improved design of the reformer, which in a more reliable way secures that the full amount of supplied gas mixture, delivered by the evaporator, is reformed into syngas.

SUMMARY

The overall object of the present invention is to provide a fuel cell system with a more compact reformer design, which in addition provides a better way secures that the full amount of supplied gas mixture is reformed into syngas.

Investigations has shown, that in the upright design of the prior art reformer, the gas will flow in the passage with the lowest resistance. This will typically be along the vertical walls of the reformer entity. The catalyst, being carbon pellets with a copper adding will tend to pack in the entity, which even more will direct the gas flow to the channels at the vertical wall and lower the effect of the reformer. The volume of the catalyst will further depend on the temperature and the oxidation level of the catalyst. Thus, even topping off the volume of the catalyst in the reformer will not secure that the reformer is filled with catalyst to a level where the process of reforming the liquid fuel into syngas is achieved optimally.

The object of the present invention is according to the invention achieved by adding the technical features of the reformer in the fuel cell system as explained in claim 1.

More specifically the fuel cell system comprises a fuel cell stack, a catalytic reformer, filled with a catalyst, having an inlet for receiving a flow of gas and an outlet for delivering a syngas to the fuel cell stack, an evaporator for evaporating a mixture of methanol and water to be fed through the catalytic reformer for producing portions of free hydrogen, the fuel cell stack being composed of a number of proton exchange membrane fuel cells each featuring electrodes in form of an anode and a cathode for delivering an electric current, the reaction of free hydrogen into ionic form with contact to the anode being proportional to the flow of electric current between the electrodes where the reformer is comprising at least two chambers for containing the catalyst, the chambers each having an inlet for receiving the flow of gas and an outlet for passing the flow of gas to the succeeding chamber or the outlet of the reformer In an embodiment, the chambers are provided by separating the entity into chambers by insertion of walls. This has the effect as to direct the gas through the reformer and secure that the flow of gas is exposed to the catalyst and reformed into syngas. Achieved is that the path through the reformer is made longer avoiding the gas to find a shortcut through the reformer.

In an embodiment, at least one opening in the wall is provided between the chambers to serve as a pathway for the flow of gas. The wall will direct the flow of gas and the opening will secure that the flow of gas is following the intended path through the system. Since openings can be made both in the top and bottom of the reformer separation walls the gas flow can be directed in the up or the down going direction within the reformer and thus less space is taken up and it is secured that the gas is sufficiently exposed to the reformer catalyst and reformed into syngas.

In a further embodiment, the openings are provided by limiting the extension of the walls within the reformer module. More specifically, the walls for separation is arranged protruding down from the top of the entity or protruding up from the bottom of the entity.

For prolonging the path for the flow of gas through the reformer module, the walls for providing chambers of the reformer are such shaped as to form an up and down zig-zagging path. The effect achieved is to provide a prolonged path for the flow of gas through the system and a better exposure to the catalyst. A further effect is reached as to direct the flow of gas away from the walls and into the mid of the catalyst material thereby providing a better exposure to the catalyst. The overall result is a better reformation of fuel into syngas.

Additionally, in an embodiment separation walls that separate the flow of gas into two or more parallel paths are inserted into the path and improve the exposure of the gas to the catalyst and the production of hydrogen rich syngas. The separation walls further serve as heating elements.

In a further embodiment, the walls are shaped in such a way that the channel is directly vertical. This has the effect of providing a long path for the flow of gas. The vertical orientation of the channel will further help the flow of gas to follow a path that leads into the mid of the catalyst material.

In a further embodiment, the walls are shaped in such a way that the channel is not orientated directly vertical. It has to be understood that the prolonging of the channel will need that directly vertical sections of the reformer are interconnected by not directly vertical orientated transportation sections. Further, the effect of not directly vertical orientated sections of the channel will be as to lead the flow of gas into the mid of the catalyst material.

In an embodiment, the walls are shaped in such a way that sections of the channel are directly vertical, optionally with not directly vertical sections. As it has to be understood the embodiment will serve to lead the flow of gas to the mid of the channel in order to expose the flow of gas to the catalyst and reform larger amounts of evaporated gas into syngas.

In an embodiment, the walls are shaped in such a way that the channel follows a path which is angled away from a straight horizontal or vertical orientation. Thus the path will direct the flow of gas towards the mid of the channel and the gas will be more exposed to the catalyst.

Further, the walls can be forming straight lines or they can be curved or geometrically shaped.

More explicitly, an appreciated embodiment of the channel will feature walls that are shaped in such a way that the flow of gas is redirected towards the mid of the channel or chamber securing that the flow of gas is exposed as much as possible to the catalyst.

In a further embodiment the walls are comprising protruding walls for maximizing the travel of the gas flow from inlet to outlet of the reformer entity. The application of protruding walls will avoid the building of a shunt path, secure that the flow of gas will be exposed to the catalyst, and enhance the process of reforming the fuel into syngas.

In another embodiment, the walls comprise protruding elements in form of noses for redirecting the gas flow away from the walls of the chambers. Since the flow of gas will be guided away from the walls and towards the mid of the catalyst material, it is secured that the gas is exposed to the catalyst and enhancing the process of reforming the fuel into syngas.

The reformer housing, as explained uses heat and a catalyst to reform the atomized methanol into a hydrogen rich syngas. The housing including all the described walls are thus serving as heating elements transferring thermal energy into the process.

The explained embodiments can be taken alone or as appreciated be combined with the overall object of featuring a reformer where the flow of gas is exposed as much as possible to the catalyst, whereby producing a syngas with a very limited if any content of non-reformed gas. By facilitating a high quality of reformed syngas, the operation of the fuel cell stack will be more reliable and efficient.

Especially appreciated is an embodiment of the system where the components form modules that fit together into a system in a modular way. The reformer module can advantageously be formed out of one piece of material, preferably aluminum, which on one side is having the cavity of the reformer with the explained pathways provided by the walls forming the channels and on the other side is equipped with heat absorbing/transporting fins for taking up thermal energy from the other side. The thermal energy to be absorbed for providing evaporation of the liquid fuel can be supplied from the exhaust of the waste gas burner. Especially appreciated is if the exhaust from the waste gas burner is forwarded fully or partly along the fins of the evaporator module in order to achieve a better efficacy of the system. It has to be understood that the modules can be physically made using various methods of production, as e.g. die-casting or by carving out the channels of the modules in a machining process.

The reformer module can as explained, preferably be made of aluminum, but the use of other thermal heat conducting materials can be foreseen, such as alloys of iron, stainless steel, magnesium as well as ceramic materials.

BRIEF DESCRIPTION OF THE DRAWINGS

Embodiments of the invention will be described with reference to the accompanying drawing, in which.

DETAILED DESCRIPTION

Figure 1:
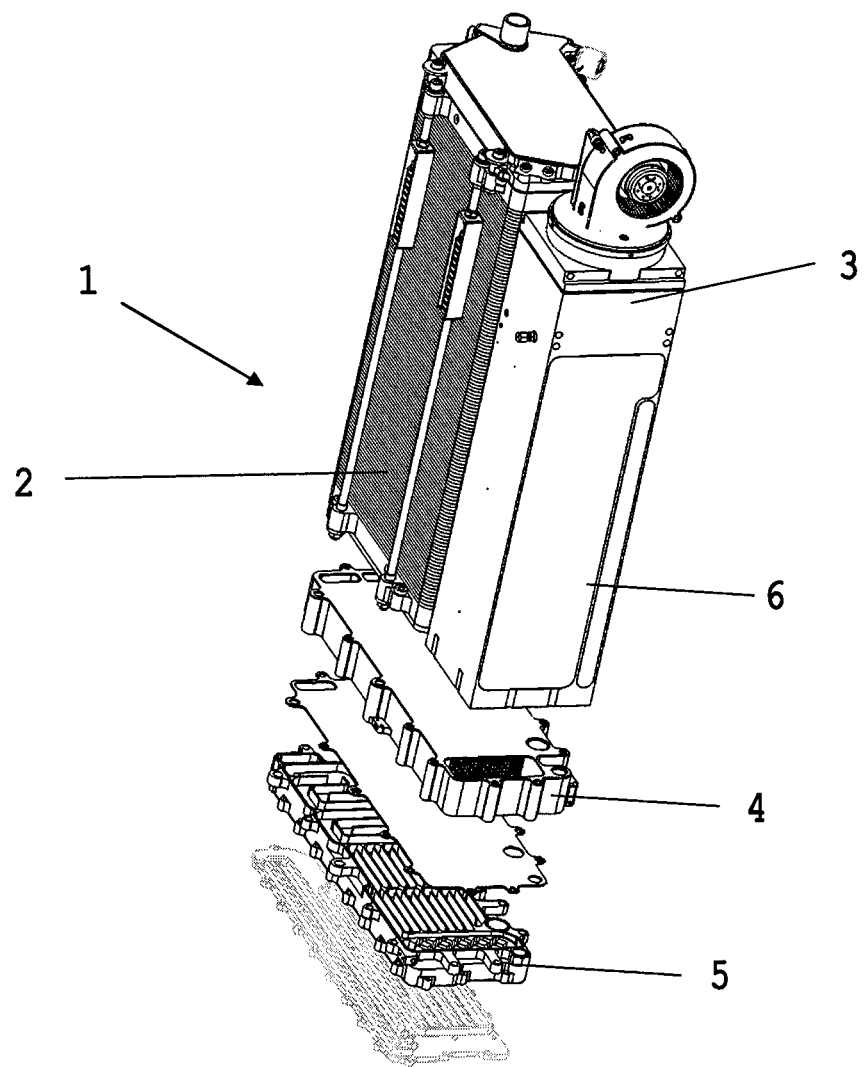
FIG. 1, shows an illustration of a fuel cell system.

FIG. 1, of the drawing shows a fuel cell system 1 comprising a fuel cell stack 2, a number of supporting modules for supplying the fuel cell stack 2 with a modified fuel enabling the fuel cell stack 2 to produce a steady flow of electrical current. The exceed gas supplied to the fuel cell stack 2 but not being converted into electrical current, is fed to the waste gas burner 3. The exhaust gas is under normal operating conditions in the temperature area of 500 degrees Celsius and the energy content is recycled for preparing the syngas for fueling the fuel cell stack 2. More detailed, the exhaust is forwarded through the heat exchanger module 4, which takes up the heat from the exhaust and transfer the heat to the neighboring module in the stack here being the evaporator module 5.

The liquid fuel, a mixture of methanol and water, is processed into a syngas consisting of free hydrogen for use in the fuel cell stack 2. In the evaporator module 5, the fuel is atomized and evaporated into the two-phase stage of the liquid fuel. Further, the evaporated gas is forwarded to the catalytic reformer module 6 that reforms the evaporated gas into a syngas consisting largely of free hydrogen. The catalytic reformer module 6 includes a catalyst including copper, which in addition to heat converts the evaporated liquid fuel into the syngas directly usable by the fuel cell stack 2. The exhaust heat of the fuel cell stack 2 and the waste gas burner 3 is led through channels in the evaporator module 5 and catalytic reformer module 6. The temperature demand in the catalytic reformer 6 is highest, so thus the catalytic reformer module 6 is arranged directly behind the waste gas burner 3. At a later stage of the exhaust channel the evaporator module 5 takes up the heat from the exhaust in order to evaporate the liquid fuel into gas.

Figure 2:
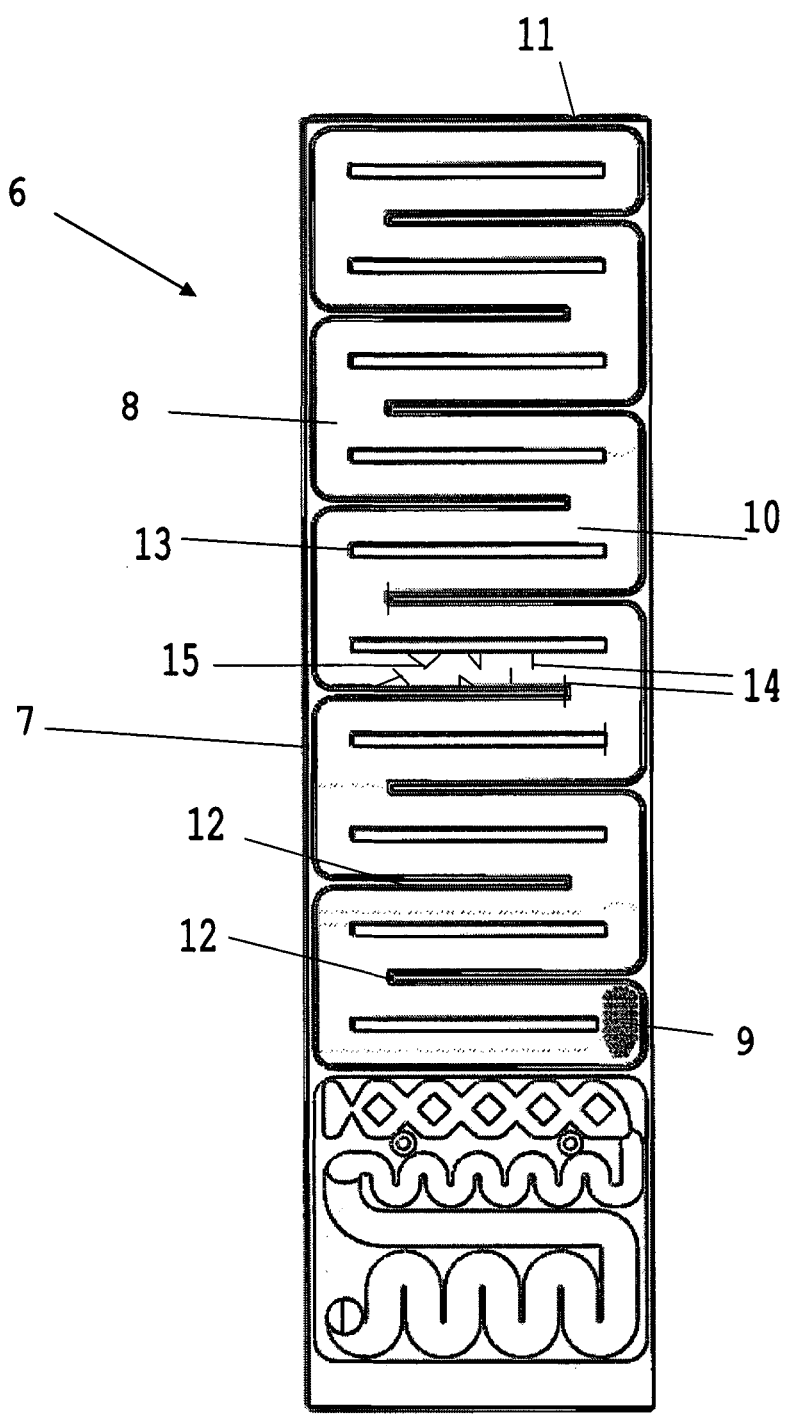
FIG. 2, shows an illustration of an reformer module for reforming atomized liquid fuel into syngas.

FIG. 2, shows an illustration of the reformer module 6 including the reformer 7. The reformer module is shown in an upright position where the orientation in the working system is angled ninety degrees counterclockwise. In other words, the reference sign no. 6 is pointing to the top of the system.

The system orientation in the working system state of the art systems is in an upright position, where the gas will flow up from the bottom to the top and be exposed to the volume of catalyst in the reformer container. As explained the drawback is that the system takes up much space in the vertical direction and that the flow of gas is as such not sufficiently exposed to the catalyst and reformed into syngas. The insufficient quality of syngas influences the overall performance of the fuel cell system in a negative way.

The reformer module 6 as pictured in FIG. 2, includes a reformer 7 including a container 8 with an inlet 9 for supplying an atomized and evaporated liquid fuel to be reformed into syngas by the catalyst 10 in the container 8. Further there is an outlet 11 for taking out the syngas. Because of the view angle of FIG. 2, the outlet is not visible but reference is made to the position. The syngas is directly forwarded to the fuel cell stack 2.

The reformer module 6 and container 8, is as can be seen from FIG. 1, formed as an elongated cube. The view in FIG. 2, thus pictures the inner wall structure of the reformer 7. A characteristics of the reformer is that the path from inlet 9 to outlet 11 goes up and down and as such the path is prolonged for achieving a long travel of the gas flow in order to expose the supplied liquid, atomized or evaporated gas to the catalyst 10. For the separation of the container 8 into chambers, walls 12 are inserted. The walls 12 are in the present embodiment going out either from the top or the bottom of the container 8, but could have the full length and be supplied with penetrations between the chambers. The penetrations could be made at specific points that would force the gas flow to follow a specific path that helps the gas flow to be more exposed to the catalyst 10 in the container 8. Further separation walls 13 can be inserted to separate the flow of gas into separate streams within the container. The walls 12 and separation walls 13, further serve as heating elements for heating the catalyst 10 and the supplied gas to a temperature where the reaction into syngas can take place. The walls 12 and separation walls 13 are in the present embodiment showed orientated directly vertical. However, the orientation of the walls can be in all directions and the walls 12 and separation walls 13 can have a shape that are not straight but could be bended or formed in another suitable pattern as e.g. forming a worm or a labyrinth form. The walls 12 or separation walls 13 could also be equipped with protruding walls 14, which will enhance the transfer of thermal energy in form of heat to the catalyst 10 or gas. Further the protruding walls 14 will help to prolong the travel of the flow of gas and thus provide a larger extend of exposure to the catalyst. This will provide a better quality of the syngas and a better overall system performance. Further the protruding walls 14 can form a nose 15 that serve to direct the stream of gas away from the walls and into the mid of the path, where the stream of gas will be more exposed to the catalyst. The nose 15 can take form starting with a straight vertical line followed by an angled line or vice versa. A nose can also be formed by two angled lines or shaped in another way that intends to direct the stream of gas away from the walls. More examples of noses 15 are shown in FIG. 2.

For the understanding of the system, the system components are build as modules that can be fixed together by conventional screws and bolts. Pathways for e.g. exhaust gas are forwarded from module to module in order to take out as much thermal energy as possible and get a high efficacy of the system. Thus the modules can be joined using gaskets in-between as can be seen in FIG. 1 between the evaporator module 5 and reformer module 6.

The modules can be made by machining of a bar of material but could also be provided by die-casting, extrusion, sintering etc. In the present embodiment, the evaporator module is provided using a bar of aluminum and carving out the channels for the reformer on a first side of the bar. The other side of the bar is provided with fins for taking up thermal energy from the burner exhaust.

Provided by the invention is an enhanced catalytic reformer for a fuel cell system, which enables a compact design of the reformer for integration into a flat, rack mountable system. With the new design, the challenges with state of the art catalytic reformer systems has been dealt with, and provided is a container for the catalyst that in a sophisticated way serves to provide a specific path through the system, which secures that the flow of gas is exposed as much as possible to the catalyst and reformed into syngas.

The invention claimed is:

1. A fuel cell system, comprising:
   a fuel cell stack comprising a plurality of proton exchange membrane fuel cells each featuring electrodes in the form of an anode and a cathode for delivering an electric current, wherein a reaction of free hydrogen into ionic form with contact to the anode being proportional to a flow of electric current between the electrodes;
   a catalytic reformer having an inlet for receiving a flow of gas and an outlet for delivering a syngas to the fuel cell stack, the reformer being filled with a catalyst;
   an evaporator for evaporating a mixture of methanol and water to be fed through the catalytic reformer for producing portions of free hydrogen;
   wherein the reformer comprises at least one chamber wall that divides the reformer into chambers for containing the catalyst, the chambers each having a width, an inlet for receiving the flow of gas, and an outlet for passing the flow of gas to a succeeding chamber or the outlet of the reformer, the reformer further comprises at least one protruding wall that extends from the at least one chamber wall into one of the chambers, the at least one protruding wall extending across only a portion of the width of the one of the chambers to direct the flow of gas away from the at least one chamber wall and into the catalyst.

2. The system according to claim 1, wherein the at least one protruding wall has a triangular cross-sectional shape.

3. The system according to claim 1, wherein at least one opening in the at least one chamber wall is provided between the chambers to serve as a pathway for the flow of gas.

4. The system according to claim 1, wherein the at least one chamber wall is arranged protruding down from a top of the reformer or protruding up from a bottom of the reformer.

5. The system according to claim 1, wherein the chambers provide an up and down zig-zagging path for the gas.

6. The system according to claim 1, further comprising separation walls that separate the flow of gas into two or more parallel paths within the chambers, and the at least one protruding wall includes a protruding wall that extends from one of the separation walls into one of the chambers.

7. The system according to claim 1, wherein the at least one chamber wall is shaped in such a way that sections of the chambers are directly vertical.

8. The system according to claim 1, wherein the at least one chamber wall is shaped in such a way that the chambers follow a path which is angled away from a straight horizontal or vertical orientation.

9. The system according to claim 1, wherein the at least one chamber wall is shaped forming straight lines or as curved or geometrically shaped lines.

10. The system according to claim 1, wherein the at least one chamber wall is shaped in such a way that the flow of gas is redirected towards a middle of one or more of the chambers.

11. The system according to claim 1, wherein the at least one protruding wall extends from the at least one chamber wall at a non-perpendicular angle, the at least one protruding wall maximizing travel of the flow of gas from the inlet to the outlet of the reformer.

12. The system according to claim 1, wherein the at least one protruding wall comprises one or more protruding elements formed as angular-shaped noses for redirecting the flow of gas away from the at least one chamber wall.

13. The system according to claim 2, wherein the at least one chamber wall serves as one or more heating elements for heating the flow of gas.

14. A fuel cell system, comprising:
a fuel cell stack comprising a plurality of proton exchange membrane fuel cells each having an anode and a cathode to deliver an electric current, wherein a reaction of free hydrogen into ionic form when contacting the anode is proportional to a flow of electric current between the anode and cathode;
a catalytic reformer filled with a catalyst, the reformer comprising:
an inlet to receive a flow of gas;
an outlet to deliver a syngas to the fuel cell stack;
at least one chamber wall that divides the reformer into chambers, the chambers configured to receive the catalyst, the chambers each having a width, an inlet to receive the flow of gas, and an outlet to pass the flow of gas to another chamber or to the outlet of the reformer;
at least one protruding wall that extends from the at least one chamber wall into one of the chambers, the at least one protruding wall extending from the at least one chamber wall at a non-perpendicular angle to direct the flow of gas away from the at least one chamber wall and into the catalyst;
an evaporator to evaporate a mixture of methanol and water to be fed through the catalytic reformer to produce portions of free hydrogen.

15. The system according to claim 14, wherein the at least one protruding wall has a triangular cross-sectional shape.

16. The system according to claim 15, wherein the at least one chamber wall includes at least one opening that extends between the chambers to serve as a pathway for the flow of gas.

17. The system according to claim 15, wherein the at least one chamber wall is arranged protruding down from a top of the reformer or protruding up from a bottom of the reformer.

18. The system according to claim 15, wherein the chambers provide an up and down zig-zagging path for the flow of gas.

19. The system according to claim 14, further comprising separation walls that separate a flow of the gas into two or more parallel paths within the chambers, and the at least one protruding wall includes a protruding wall that extends from one of the separation walls into one of the chambers.

20. The system according to claim 15, wherein the at least one chamber wall is shaped so that sections of the chambers are arranged vertically relative to each other.

* * * * *